United States Patent [19]

Ege

[11] 3,920,693
[45] Nov. 18, 1975

[54] PRODUCTION OF 3-AMINOPYRAZOLES
[75] Inventor: Güenter Ege, Heidelberg, Germany
[73] Assignee: BASF Aktiengesellschaft, Ludwigshafen (Rhine), Germany
[22] Filed: Dec. 16, 1974
[21] Appl. No.: 532,756

[30] Foreign Application Priority Data
Jan. 5, 1974 Germany............................ 2400415
Feb. 19, 1974 Germany............................ 2407890

[52] U.S. Cl............................. 260/310 R; 260/310
[51] Int. Cl.$^2$................ C07D 231/38; C07D 231/14
[58] Field of Search................................ 260/310 R

[56] References Cited
UNITED STATES PATENTS

| | | | |
|---|---|---|---|
| 2,759,949 | 8/1956 | Hitchings et al. | 260/310 R |
| 2,975,188 | 3/1961 | Gold et al. | 260/310 R |
| 2,998,426 | 8/1961 | Dickinson, Jr. et al. | 260/310 R |
| 3,144,477 | 8/1964 | Martin et al. | 260/310 R |
| 3,187,006 | 6/1965 | Druey et al. | 260/310 R |

FOREIGN PATENTS OR APPLICATIONS

| | | | |
|---|---|---|---|
| 1,274,584 | 8/1968 | Germany | 260/310 R |
| 1,044,646 | 4/1951 | France | 260/310 R |
| 1,296,488 | 8/1961 | France | 260/310 R |

OTHER PUBLICATIONS

Elderfield, "Heterocyclic Compounds", Vol. 5, pp. 74–76 Published by John Wiley & Sons, Inc. N.Y. (1957).
Wiley & Wiley, "Pyrazoles, Pyrazolines, Pyrazolidines & Condensed Rings", pp. 185 & 191, (1967), Interscience Publishers, N.Y.

Primary Examiner—Donald B. Moyer

[57] ABSTRACT

Production of 3-aminopyrazoles by the reaction of a hydrazine with a 2,3-halosubstituted propionitrile or a 2-halosubstituted acrylonitrile. The process is particularly useful for the production of 3-aminopyrazole. The 3-aminopyrazoles are valuable diazo components, for example for the manufacture of basic dyes.

1 Claim, No Drawings

PRODUCTION OF 3-AMINOPYRAZOLES

This application discloses and claims subject matter described in German Patent Applications P 24 00 415.7 and P 24 07 890.8, filed January 5, 1974 and February 19, 1974 respectively, which are incorporated herein by a reference.

The invention relates to a process for the production of 3-aminopyrazoles of the formula (I):

$$R-N\underset{N}{\overset{C=CH}{\underset{\diagdown\!\!\!\diagup}{|\quad\ |}}}C-NH_2 \quad (I)$$

in which
R is hydrogen or unsubstituted or substituted alkyl, cycloalkyl, aralkyl or phenyl; and
$R^1$ is hydrogen, alkyl, cycloalkyl, aralkyl or unsubstituted or substituted phenyl,
which comprises reacting a compound of the formula (IIa) or (IIb):

$$R^1-CH-CH-CN \quad \text{or} \quad R^1-CH=C-CN$$
$$\ \ \ \ \ |\ \ \ \ \ |\qquad\qquad\qquad\qquad\ \ \ |$$
$$\ \ \ \ \ X\ \ \ X\qquad\qquad\qquad\qquad\ \ \ X$$

(IIa) \qquad\qquad\qquad (IIb)

in which X is chlorine or bromine in an alkaline medium with a hydrazine of the formula (III):
$$R-NH-NH_2 \quad (III)$$

in which R and $R^1$ have the above meanings.

Examples of radicals R are alkyl of one to four carbon atoms, hydroxyalkyl of two or three carbon atoms, cyanoalkyl of two or three carbon atoms, carbamoylalkyl of two or three carbon atoms, cyclohexyl, benzyl and particularly hydrogen.

In addition to those already mentioned, the following specific examples of R are given:
methyl, ethyl, propyl, β-hydroxyethyl, β-hydroxypropyl, β-cyanoethyl, β-cyano-β-methylethyl and β-carbamoylethyl.

Examples of radicals $R^1$ are: methyl, cyclohexyl, phenyl and particularly hydrogen.

It is convenient to carry out the reaction of the compound of formula (II) with that of formula (III) by placing in a vessel an alkaline solution or suspension of a compound of formula (III) and gradually adding a compound of formula (II). It is convenient to apply cooling at the commencement of the reaction.

When reacting a compound of formula (IIa) it is advisable to use at least 2 moles of the alkali required for setting up the alkaline medium.

Examples of compounds for setting up the alkaline range are the conventional alkalies such as NaOH, KOH, $Na_2CO_3$, $K_2CO_3$, $NaHCO_3$, $KHCO_3$, NaO-alkyl (of one to four carbon atoms) or $Ca(OH)_2$. A tertiary amine or an excess of the compound of formula (III) may also be used. Solvents or suspension agents, in addition to water, include for example low molecular weight alkanols and glycols such as methanol, ethanol, isobutanol, glycol and methylglycol. Details of the production may be seen in the Examples.

The new process is particularly valuable for the production of unsubstituted 3-aminopyrazole.

As compared with prior art methods ((i) H. Reimlinger, A. van Overstraeten and H. G. Viehe, Chem. Ber. 94 (1961), 1036, (ii) Dorn and A. Zubek, Org. Synth. 48 (1968), 8 and (iii) K. J. Klebe and C. L. Habraken, Synthesis 1973, 294) for the production of 3-aminopyrazoles, the new process offers great advantage in the number of necessary operations and simplicity in carrying them out, because it can be carried out in a single vessel. The pyrazoles are obtained in excellent yields and high purity.

Pyrazoles of formula (I) are valuable diazo components, for example for the manufacture of basic dyes.

The following Examples illustrate the invention.

EXAMPLE 1

55 g (1.1 mole) of hydrazine hydrage is added to a solution of 140 g (1 mole) of $K_2CO_3$ in 400 ml of water and while stirring vigorously at from 5° to 10°C (cooling with ice and common salt) 87.5 g (1 mole) of 2-chloroacrylonitrile is dripped in under nitrogen within one hour. Stirring is continued for another hour at ambient temperature and for 90 minutes at from 40° to 50°C and the whole is allowed to stand overnight. It is then extracted for 24 hours with ethyl acetate and the residual crude oil (75 g, 90%) is distilled under nitrogen in a high vacuum. 58 g (70%) of 5-aminopyrazole is obtained having a boiling point of 120° to 122°C at 0.3 mm. The compound becomes solid on cooling (better when seeded) and has a melting point of 36°C. It is consistent in the infrared spectrum with authentic 3(5)-aminopyrazole picrate; melting point 208°C after recrystallization from methanol.

The aminopyrazoles characterized in the following Table by identification by R and $R^1$ may be obtained by an analogous process.

TABLE $$R-N\underset{N}{\overset{R^1-C=C-H}{\underset{\diagdown\!\!\!\diagup}{|\quad\ \ \ |}}}C-NH_2$$

| Example | R | $R^1$ |
|---|---|---|
| 2 | $CH_3$ | H |
| 3 | $CH_2C_6H_5$ | H |
| 4 | $C_2H_5$ | H |
| 5 | $C_4H_9$ | H |
| 6 | $CH_2CH_2OH$ | H |
| 7 | $CH_2CH_2CN$ | H |
| 8 | $CH_2CH_2CONH_2$ | H |
| 9 | $CH_2CHOHCH_3$ | H |
| 10 | $CH_2-CH{<}^{CH_3}_{CN}$ | H |
| 11 | $-C_6H_{11}$ | H |
| 12 | H | $CH_3$ |
| 13 | H | $C_6H_5$ |
| 14 | $CH_3$ | $CH_3$ |
| 15 | $CH_2C_6H_5$ | $CH_3$ |
| 16 | $C_6H_5$ | H |

EXAMPLE 17

3-aminopyrazole:

55 g (1.1 moles) of hydrazine hydrate is added to a solution of 285 g (2.06 moles) of $K_2CO_3$ in 400 ml of water and then 123 g (1 mole) of 2,3-dichloropropionitrile is dripped in at from 10° to 20°C while stirring vigorously. The solution becomes yellow and cloudy during the dripping and after a short time crystals of KCL are deposited. The whole is stirred for 5 hours at ambient temperature and for 24 hours at from 50° to 60°C and is then allowed to cool. The crystals are suction filtered and washed with ether or ethyl acetate and the filtrate is extracted for 48 hours with ether or for 24 hours with ethyl acetate. The solvent is then distilled off. The crude oil which remains (62 g, 75%) is distilled in a high vacuum. 56 g (68%) of the pyrazole is obtained having a boiling point of from 105° to 108°C at 0.025 mm. When the distillate is seeded it becomes solid and has a melting point of 36° to 40°C. The infrared spectrum agrees with that of authenic 3(5)-aminopyrazole.

I claim:

1. A process for the production of a 3-aminopyrazole of the formula:

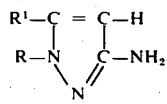

wherein
R is hydrogen, alkyl of one to four carbon atoms, hydroxyalkyl of two or three carbon atoms, cyanoalkyl of two or three carbon atoms, carbamoylalkyl of two or three carbon atoms, cyclohexyl, benzyl or phenyl; and
R¹ is hydrogen, methyl, cyclohexyl or phenyl,
which comprises
reacting a compound of the formula:

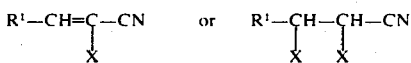

wherein X is chloro or bromo,
in an alkaline medium with a hydrazine of the formula
R—NH—NH₂,
R and R¹ having the meanings given above.

* * * * *